United States Patent
Ko et al.

(10) Patent No.: US 9,254,824 B2
(45) Date of Patent: Feb. 9, 2016

(54) ADAPTIVE ANTI-COLLISION METHOD FOR VEHICLE

(71) Applicant: AUTOMOTIVE RESEARCH & TESTING CENTER, Lugang Chen, Changhua Hsien (TW)

(72) Inventors: Ming-Kuan Ko, Changhua Hsien (TW); Chi-Chun Yao, Changhua Hsien (TW); Shih-Chieh Huang, Changhua Hsien (TW)

(73) Assignee: AUTOMOTIVE RESEARCH & TESTING CENTER, Lugang Chen, Changhua Hsien (TW)

( * ) Notice: Subject to any disclaimer, the term of this patent is extended or adjusted under 35 U.S.C. 154(b) by 55 days.

(21) Appl. No.: 14/143,279

(22) Filed: Dec. 30, 2013

(65) Prior Publication Data
US 2015/0183410 A1 Jul. 2, 2015

(51) Int. Cl.
| | | |
|---|---|---|
| *B60T 8/174* | (2006.01) | |
| *G05B 19/4061* | (2006.01) | |
| *G08B 7/00* | (2006.01) | |
| *B60T 8/1755* | (2006.01) | |
| *B60T 8/58* | (2006.01) | |
| *B60T 7/22* | (2006.01) | |

(52) U.S. Cl.
CPC . *B60T 8/174* (2013.01); *B60T 7/22* (2013.01); *B60T 8/17558* (2013.01); *B60T 8/58* (2013.01)

(58) Field of Classification Search
USPC .................. 701/36–49; 340/901–905
See application file for complete search history.

(56) References Cited

U.S. PATENT DOCUMENTS

| | | | | | |
|---|---|---|---|---|---|
| 5,343,206 | A * | 8/1994 | Ansaldi | ................. | G01S 13/931 342/179 |
| 5,983,161 | A * | 11/1999 | Lemelson | ............... | G01S 19/11 340/436 |
| 6,463,372 | B1 * | 10/2002 | Yokota | ................. | B60N 2/2821 280/801.1 |
| 7,106,174 | B1 * | 9/2006 | Powell | ............... | G06K 7/10039 340/10.1 |
| 7,444,311 | B2 * | 10/2008 | Engstrom | ............ | B60K 41/004 706/20 |
| 8,280,560 | B2 * | 10/2012 | Huang | .................. | B60W 30/12 340/436 |
| 8,370,021 | B2 * | 2/2013 | Okada | ...................... | B60R 1/12 340/436 |
| 2007/0021915 | A1 * | 1/2007 | Breed | .................. | B60N 2/2863 701/301 |

(Continued)

OTHER PUBLICATIONS

Ahmad Aljaafreh, "Driving Style Recognition Using Fuzzy Logic", Jul. 27, 2012, 2012 IEEE International Conference on Vehicular Electronics and Safety, Istanbul, Turkey, pp. 460-463. http://ieeexplore.ieee.org/xpl/articleDetails.jsp?arnumber=6294318.*

*Primary Examiner* — Rami Khatib
*Assistant Examiner* — Timothy Nesley
(74) *Attorney, Agent, or Firm* — patenttm.us (57) ABSTRACT

An adaptive anti-collision method for vehicles has steps of creating multiple driving patterns with each driving pattern corresponding to a vehicle speed, a safe distance and a braking distance parameter, such as longer safe distance configured for faster vehicle speed, and higher vehicle speed or shorter safe distance for different road condition, acquiring dynamic information, such as vehicle speed or acceleration, of the vehicle using sensors on the vehicle, combining the dynamic information and drivers' driving behavior to determine a driving pattern through a statistical analysis and a neural network, adjusting control parameters of the vehicle according to the driving pattern for an electronic control unit of the vehicle to issue an alert or activate a braking action according to the driving pattern. Accordingly, the anti-collision method can be adapted to different vehicle speed, road condition and drivers' driving habits for adjusting the safe distance and the braking system.

9 Claims, 12 Drawing Sheets

(56) References Cited

U.S. PATENT DOCUMENTS

| | | | |
|---|---|---|---|
| 2008/0040004 A1* | 2/2008 | Breed | 701/45 |
| 2008/0119960 A1* | 5/2008 | Beaulieur | B25J 9/1666 700/255 |
| 2010/0023216 A1* | 1/2010 | Huang | B62D 6/007 701/42 |
| 2014/0104051 A1* | 4/2014 | Breed | G06K 9/00791 340/435 |
| 2015/0042478 A1* | 2/2015 | Kuo | G08B 21/02 340/576 |

* cited by examiner

| ROAD CONDITION | BRAKING DIST. (M) / FRICTION COEF. | VEHICLE SPEED (KM/H) | | | | | | | | | | | | |
|---|---|---|---|---|---|---|---|---|---|---|---|---|---|---|
| | | 20 | 25 | 30 | 35 | 40 | 45 | 50 | 55 | 60 | 65 | 70 | 75 | 80 |
| ASPHALT | | | | | | | | | | | | | | |
| (NEW) | 0.85 | 1.8 | 2.3 | 4.2 | 5.6 | 7.4 | 9.3 | 11.5 | 14.0 | 16.6 | 19.9 | 23.0 | 26.2 | 30.0 |
| DRY (1~3 YEAR) | 0.75 | 2.0 | 3.2 | 4.6 | 6.4 | 8.4 | 10.5 | 13.0 | 16.0 | 18.0 | 22.8 | 26.0 | 30.0 | 34.0 |
| VERY DRY (>3 YEAR) | 0.70 | 2.2 | 3.4 | 5.0 | 6.9 | 9.0 | 11.5 | 14.1 | 17.0 | 20.2 | 24.0 | 27.9 | 32.0 | 36.0 |
| WET (NEW) | 0.80 | 1.9 | 3.2 | 4.4 | 6.0 | 8.8 | 10.0 | 12.2 | 15.0 | 17.9 | 21.0 | 24.5 | 28.0 | 32.0 |
| VERY WET (1~3 YEAR) | 0.65 | 2.4 | 3.7 | 5.4 | 7.4 | 9.5 | 12.2 | 15.4 | 18.4 | 22.0 | 26.0 | 30.0 | 35.0 | 37.0 |
| VERY WET (>3 YEAR) | 0.60 | 2.6 | 4.1 | 5.9 | 8.0 | 10.5 | 13.4 | 16.5 | 20.0 | 24.0 | 28.5 | 32.2 | 37.0 | 41.0 |
| CONCRETE | | | | | | | | | | | | | | |
| (NEW) | 0.90 | 1.7 | 2.7 | 3.8 | 5.3 | 6.9 | 8.9 | 10.9 | 13.2 | 16.0 | 18.6 | 21.8 | 25.0 | 28.0 |
| DRY (1~3 YEAR) | 0.78 | 1.9 | 2.2 | 4.5 | 6.0 | 7.9 | 10.2 | 12.5 | 15.0 | 18.2 | 21.1 | 25.0 | 28.5 | 35.0 |
| VERY DRY (>3 YEAR) | 0.70 | 2.2 | 2.5 | 5.0 | 6.7 | 8.9 | 11.4 | 14.2 | 17.0 | 20.5 | 24.0 | 28.0 | 32.2 | 37.0 |
| WET (NEW) | 0.78 | 1.9 | 3.1 | 4.5 | 6.0 | 7.9 | 10.2 | 12.5 | 15.0 | 18.2 | 21.1 | 25.0 | 28.5 | 35.0 |
| VERY WET (1~3 YEAR) | 0.70 | 2.2 | 3.5 | 5.0 | 6.7 | 8.9 | 11.4 | 14.2 | 17.0 | 20.5 | 24.0 | 28.0 | 32.2 | 37.0 |
| VERY WET (>3 YEAR) | 0.62 | 2.5 | 3.8 | 5.6 | 7.6 | 10.2 | 12.7 | 16.0 | 19.1 | 23.0 | 26.9 | 31.5 | 36.0 | 41.0 |
| SAND GRAVEL | 0.68 | 2.3 | 3.1 | 5.2 | 7.2 | 9.0 | 11.6 | 14.0 | 17.2 | 21.0 | 24.0 | 28.0 | 32.0 | 36.0 |

FIG.3

| DRIVING PATTERN / VEHICLE SPEED | VERY SAFE(A) M >> S | SAFE(B) M > S | SLIGHTLY DANGEROUS(C) S>M>2/3S | VERY DANGEROUS(D) M < 2/3S |
|---|---|---|---|---|
| V=0~10 | 214 TIMES | 50 TIMES | 64 TIMES | 78 TIMES |
| V=10~20 | 100 TIMES | 200 TIMES | 100 TIMES | 100 TIMES |
| V=20~30 | 200 TIMES | 70 TIMES | 190 TIMES | 90 TIMES |
| V=30~40 | 150 TIMES | 150 TIMES | 180 TIMES | 140 TIMES |
| V=40~50 | 160 TIMES | 180 TIMES | 200 TIMES | 130 TIMES |
| V=50~60 | 210 TIMES | 170 TIMES | 180 TIMES | 150 TIMES |
| V=60~70 | 200 TIMES | 220 TIMES | 200 TIMES | 160 TIMES |

ADAPTIVE ANTI-COLLISION METHOD FOR VEHICLE

BACKGROUND OF THE INVENTION

1. Field of the Invention

The present invention is related to an anti-collision method for vehicle, and more particularly to an adaptive anti-collision method providing timely alert information by predicting driver's condition and fine-tuning vehicle parameters.

2. Description of the Related Art

Conventional vehicles have been equipped with various driving safety assistance apparatuses, such as FCWS (Forward Collision Warning System) or AEB (Autonomous Emergency Braking), to avoid drivers to be at the risk of collision upon driving. Those driving safety assistance apparatuses primarily utilize a radar detector mounted on a front end of a present vehicle to detect a distance between a vehicle or an obstacle in the front and the present vehicle with radar wave. If the distance between the present vehicle and the vehicle in the front is lower than a preset distance, those driving safety assistance apparatuses activate a braking system of the present vehicle to stop the present vehicle and issue an alert, thereby avoiding rear-end collision or other type of collision.

Figure 12:
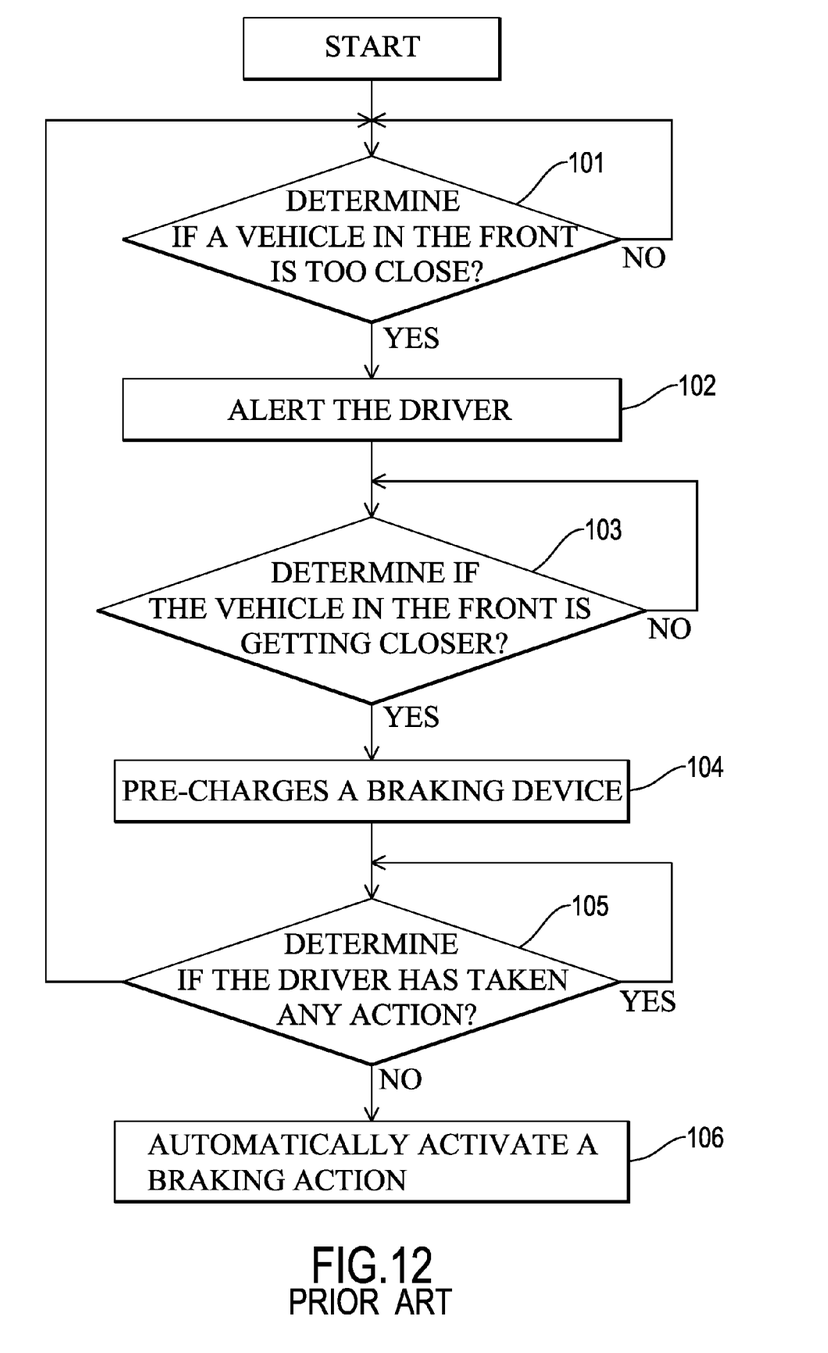
FIG. 12 is a flow diagram of algorithm performed by a conventional anti-collision system.

With reference to FIG. 12, an anti-collision algorithm performed by a conventional anti-collision system determines if a vehicle or an obstacle in the front is too close to a present vehicle (101), if positive, sends forth a sound or an alert light to remind the driver of the vehicle in the front being too close (102), further determines if the vehicle in the front is getting closer to the present vehicle (103), if positive, pre-charges a braking device of the present vehicle, determines if the driver has taken any action, such as pressing brake pedal, to avoid vehicle collision (105), and if negative, forcibly decelerate the present vehicle to keep a safe distance for prevention of vehicle collision (106). However, the drawback of the foregoing FCWS, AEB or anti-collision systems is the use of a pre-determined value for the safe distance between vehicles because the safe distance of the present vehicle varies with vehicle-driving speeds (for example, the safe distance should be increased upon driving at a high speed), drivers' ways of determining the safe distance between vehicles (longer distance for drivers with higher safety concern and shorter distance for drivers having vehicle-following and abruptly barking habits), road conditions, performance of braking systems, or ground adherence of tires. The foregoing anti-collision systems do not meet drivers' driving habits for failing to brake the vehicles at the right time or earlier because of the fixed and pre-determined safety distance.

SUMMARY OF THE INVENTION

An objective of the present invention is to provide an adaptive anti-collision method for vehicles capable of adjusting the safe distance and controlling the braking system in response to different vehicle speed, road condition and drivers' driving habits.

To achieve the foregoing objective, the adaptive anti-collision method for vehicles, wherein each vehicle having multiple sensors and a control unit, the sensors acquire a vehicle speed and a measured distance between the vehicle and an obstacle in the front, and the control unit is electrically connected to an electronic control unit (ECU) of the vehicle and the sensors, is performed by the control unit and has steps of:

creating multiple driving patterns and indices or alert levels corresponding to the driving patterns, wherein each driving pattern has a vehicle speed, a safe distance, a reference braking distance related parameter;

analyzing the vehicle speed and the measured distance acquired by the sensors to determine a corresponding driving patterns, wherein actual driving conditions of the vehicle are statistically analyzed to acquire a driving state of a driver of the vehicle and classify into the corresponding driving pattern associated with the driver so as to generate one of the indices or the alert levels corresponding to the driving pattern and vary control parameters of the vehicle according to the classified driving pattern; and providing driver assistance and control, wherein if the driver has not responded to the alert, the control unit instructs the ECU to issue the alert according to a corresponding control parameter and to provide a braking assistance or brake the vehicle, The foregoing adaptive anti-collision method for vehicles first creates multiple driving patterns with each driving pattern corresponding to a vehicle speed, a safe distance and a braking distance parameter (for example: longer safe distance configured for faster vehicle speed, and higher vehicle speed or shorter safe distance for different road condition such as asphalt pavement or sand-gravel pavement), acquires dynamic information, such as vehicle speed or acceleration, of the vehicle using sensors on the vehicle, combines the dynamic information and drivers' driving behavior to determine a driving pattern through a statistical analysis and a neural network, adjusts control parameters of the vehicle according to the driving pattern for an electronic control unit of the vehicle to issue an alert or activate a braking action according to the driving pattern. Accordingly, the adaptive anti-collision method can be tailored to different vehicle speed, road condition and drivers' driving habits for adjusting the safe distance and the braking system.

Other objectives, advantages and novel features of the invention will become more apparent from the following detailed description when taken in conjunction with the accompanying drawings.

DETAILED DESCRIPTION OF THE INVENTION

Figure 1:
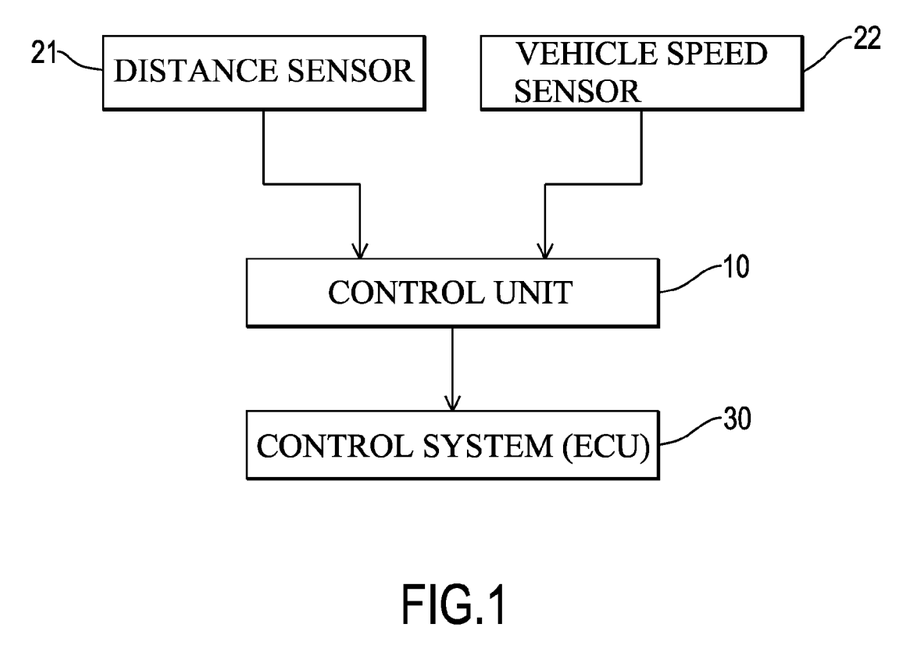
FIG. 1 is a functional block diagram of an adaptive anti-collision system for vehicle in accordance with the present invention.

With reference to FIG. 1, an adaptive anti-collision system in accordance with the present invention has a control unit 10, a distance sensor 21 and a vehicle speed sensor 22 mounted on a present vehicle. The control unit 10 is electrically connected to a control system 30 of the present vehicle and the distance sensor 21 and the vehicle speed sensor 22. In the present embodiment, the control system 30 is an electronic control unit (ECU) of the present vehicle. The control unit 10 may be externally connected to the control system 30 or integrated with the control system 30. The distance sensor 21 may be an imaging device (camera), a radar device or lidar (Light Detection and Ranging) device, or a combination of various sensors. The vehicle speed sensor 22 may be a speedometer on the present vehicle, an external speed meter or an accelerometer. The control unit 10 acquires a distance between the present vehicle and a vehicle in the front from the distance sensor 21 and a vehicle speed from the vehicle speed sensor 22, and performs a determination process for the control system 30 to be driven so as to activate a braking device of the present vehicle or to issue an alert sound or light.

Figure 2:
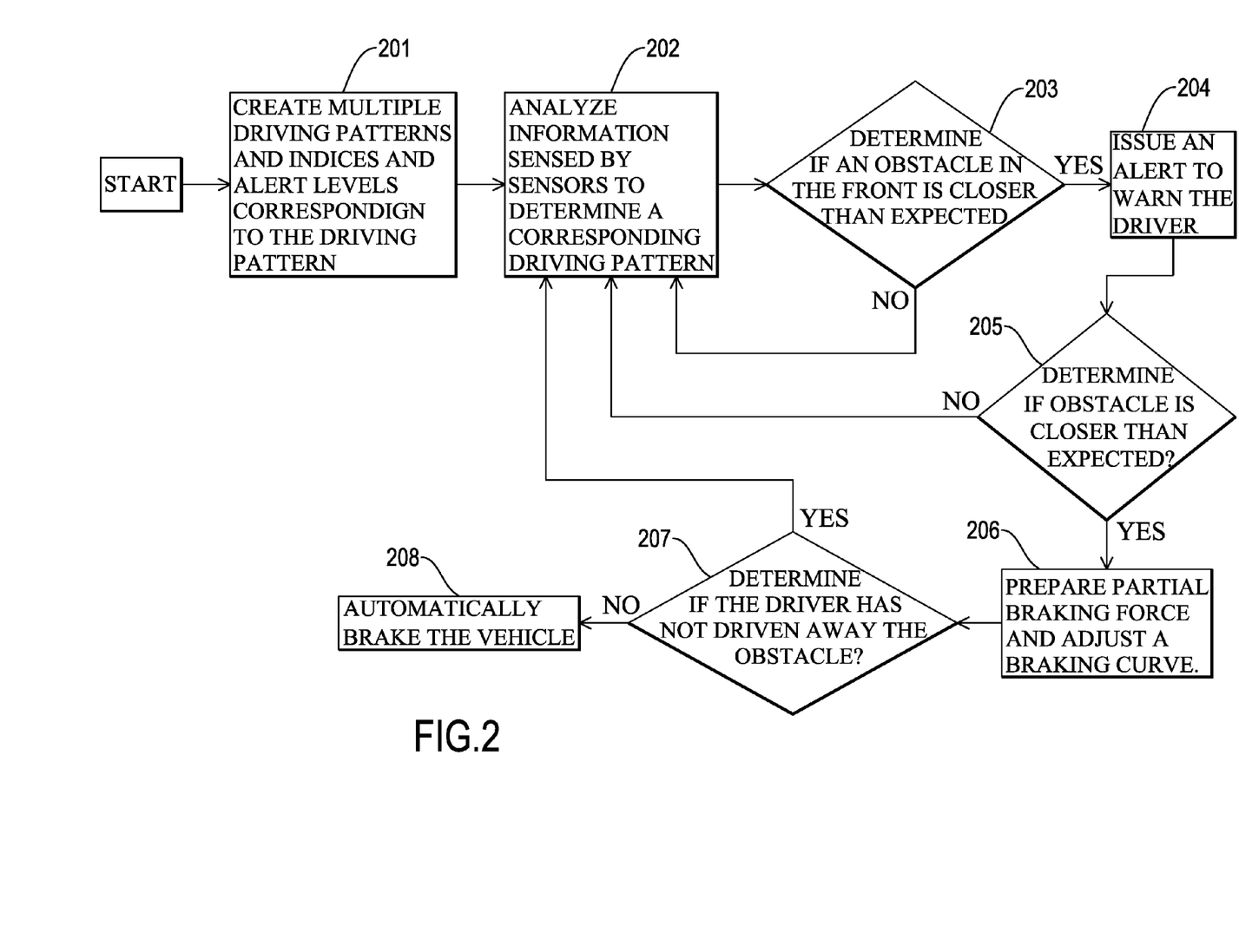
FIG. 2 is a flow diagram of a determination process performed by a control unit of the adaptive anti-collision system in FIG. 1.

With reference to FIG. 2, the determination process performed by the control unit 10 has steps of:

Step 201: Create multiple driving patterns and indices or alert levels corresponding to the driving patterns. The control unit 10 is built in with the multiple driving patterns beforehand. Each driving pattern includes a vehicle speed, a safe distance, and a reference braking distance related parameter.

Step 202: Analyze information sensed by the foregoing sensors to determine a corresponding driving pattern. Actual driving conditions (a safe distance, driving speed, acceleration/deceleration value) acquired by the distance sensor 21 and the vehicle speed sensor 22 are analyzed by a statistical method and a neural algorithm to classify into a corresponding driving pattern and generate an index or an alert level corresponding to the driving pattern.

Step 203: Determine if a vehicle or an obstacle in front of the present vehicle is closer than expected. The distance sensor 21 is used to detect a distance between the vehicle in the front and the present vehicle. If the distance is less than the index of a driving patter pertaining to the driver, perform Step 204, and otherwise, resume Step 707.

Step 204: Issue an alert to warn the driver.

Sep 205: Determine if the vehicle or obstacle in the front is still closer than expected, if positive, perform Step 206, and otherwise, resume Step 202.

Step 206: Vary multiple control parameters of the vehicle according to the driving pattern pertaining to the driver for the control system 30 to pre-charge pressure of the braking device of the vehicle for preparation of partial braking force and to adjust a braking curve of the vehicle.

Step 207: Determine if the driver has not yet driven away the vehicle or obstacle in the front, if negative, perform Step 208, and otherwise, resume Step 202.

Step 208: Automatically or forcibly activate the braking device of the vehicle to slow down or stop the vehicle.

Figure 3:
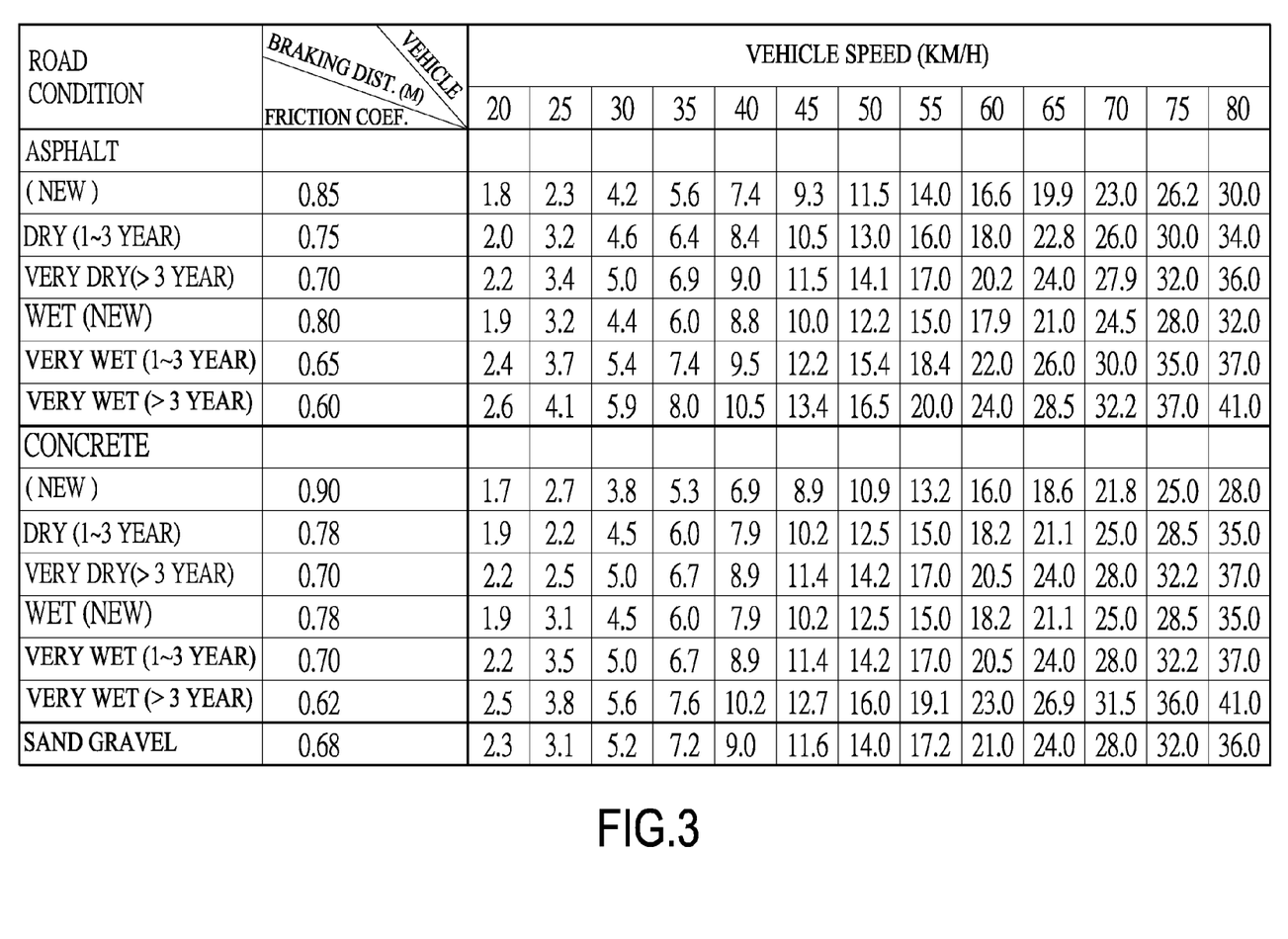
FIG. 3 is a mapping table for braking distances and vehicle speeds used by the adaptive anti-collision system in FIG. 1.

With reference to FIG. 3, a mapping table associated with braking distance and speed of a vehicle and road friction coefficient is shown. The road friction coefficients of different road surfaces, such as 0.85 for new asphalt pavement, 0.90 for new concrete pavement, and 0.68 for sand-gravel pavement, are listed on the leftmost column. When asphalt or concrete pavement has been used for years or is wet, the road friction coefficient will decrease. Different vehicle speeds (Km/H) are listed on the top row. The braking distance (meter) of the vehicle can be mapped to by referring to corresponding road friction coefficient and vehicle speed. For example, when the vehicle is driven on a new asphalt pavement (road friction coefficient 0.85) at the vehicle speed 60 Km/H, the braking distance of the vehicle is approximately 16.6 meters as a reference value for braking distance. The braking distance of a vehicle can be obtained from the following braking distance equation.

$$S = \frac{V^2}{2 \times g \times u}$$

where
S is the braking distance (m);
V is the speed of the present vehicle (m/s);
g is the gravity (9.8 m/s$^2$);
u is the road friction coefficient.

Figure 4:
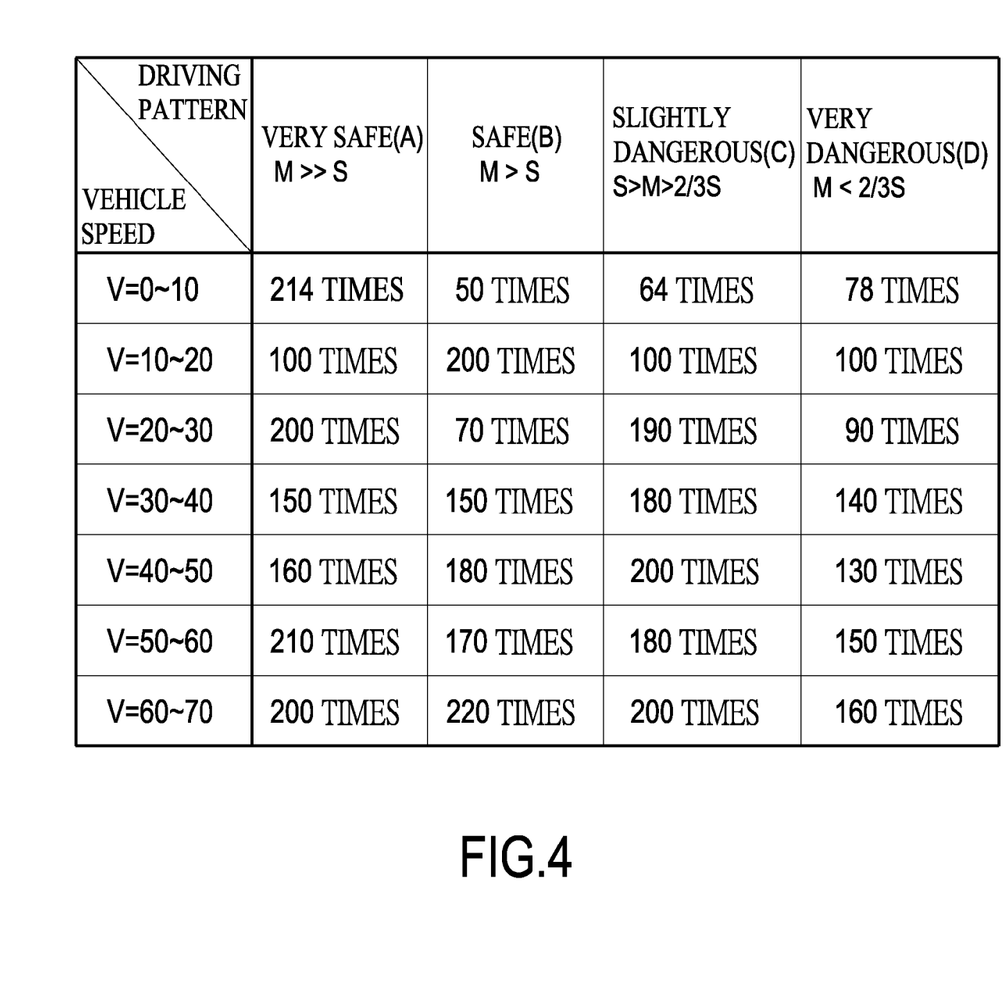
FIG. 4 is a sample statistics table for distances between vehicles and safe distances used by the adaptive anti-collision system in FIG. 1.

With reference to FIG. 4, statistical samples of driving behavior of multiple drivers in the table are acquired prior to establishment of multiple driving patterns for distinguishing different safety levels. Different vehicle speed ranges spaced apart by 10 Km/H are listed on the leftmost column. Four types of driving patterns, namely, very safe level, safe level, slightly dangerous level, and very dangerous level, are listed on the top row of the table. Each driving pattern corresponds to a comparison relationship between measured distance (M) and safe distance (S). The very safe level represents that the measured distance or the distance to the vehicle in the front is greater than double of the safe distance (M>2S). The safe level represents that the measured distance or the distance to the vehicle in the front is greater than the safe distance. The slightly dangerous level represents that the measured distance is within two thirds of the safe distance and the safe distance (S>M>2/3S) or means that the distance to the vehicle in the front is slightly shorter than the safe distance when the driver is driving. The very dangerous level represents that the measured distance is less than two thirds of the safe distance (M<2/3S) or means that timely brake may not be able to make it if the distance to the vehicle in the front is shorter than two thirds of the safe distance.

Figure 5A:
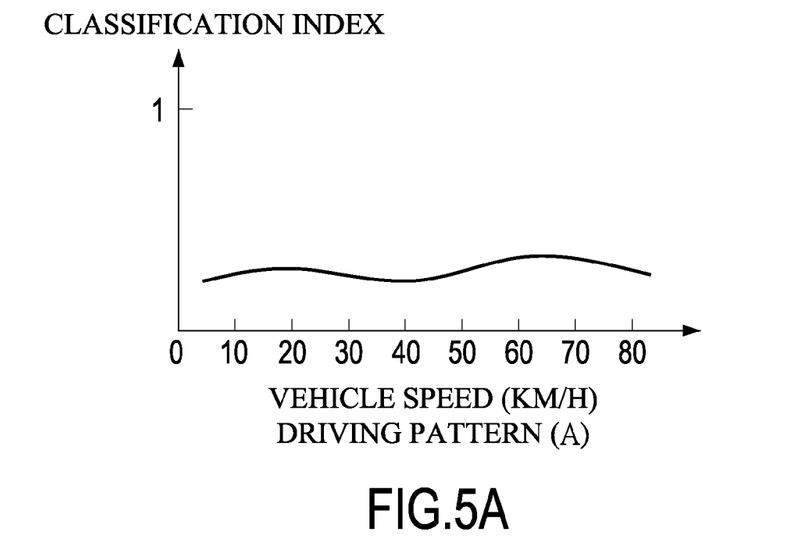
FIGS. 5A and 5B are curve diagrams showing relationship between classification index and driving speed associated with two driving patterns in accordance with the present invention.
Figure 5B:
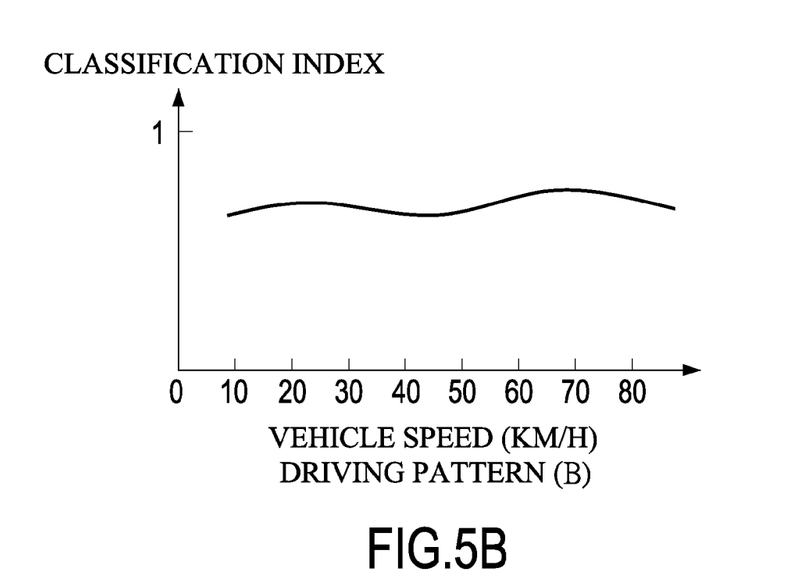

With reference to FIGS. 5A and 5B, weighting adjustment of the classified driving patterns is shown. A classification index can be expressed by the following equation.

$$\text{Index} = \frac{\left(\frac{(a1 \times A + a2 \times B + a3 \times C + a4 \times D)}{a1 + a2 + a3 + a4}\right)}{(A + B + C + D)}$$

where a1, a2, a3 and a4 are weight factors, and A, B, C, D are relative frequencies of the corresponding safe levels.

After such normalization applies, the classification index with a lower value indicates a very safe level or a safe level while the classification with a higher value indicates a slightly dangerous level or a very dangerous level, in other words, the classification index of the driving pattern A in FIG. 5A indicates a safer level than the classification index of the driving pattern B in FIG. 5B.

Figure 6:
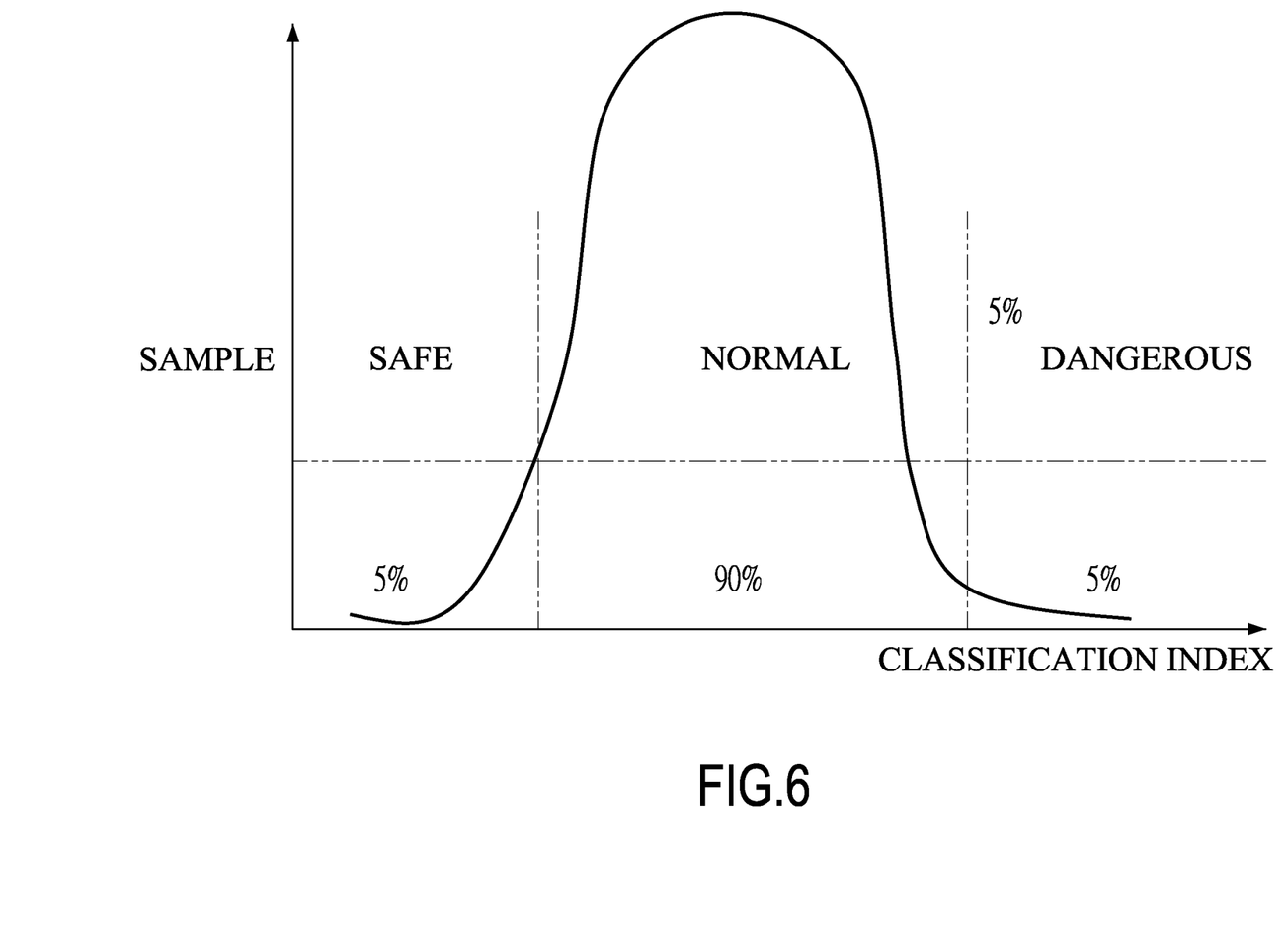
FIG. 6 is a distribution diagram showing different driving patterns in accordance with the present invention.

With reference to FIG. 6, a driver behavior distribution is shown. A distribution curve of the foregoing driving patterns can be obtained through the Gaussian distribution to combine the safe level and the slightly dangerous level as a normal level. The percentages of the very safe level, the normal level and the very dangerous level are roughly 5%, 90% and 5% of a total number of the driving patterns respectively.

Figure 7A:
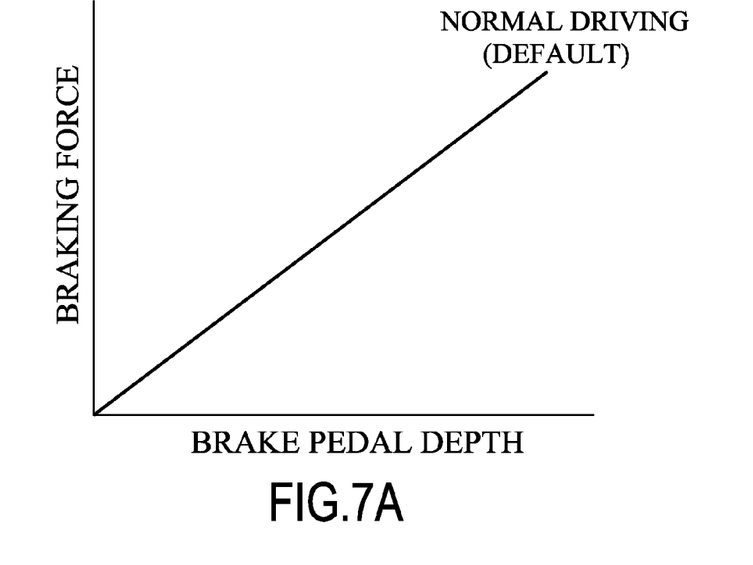
FIGS. 7A and 7B are curve diagrams showing adjustment of a braking parameter curve in accordance with the present invention.
Figure 7B:
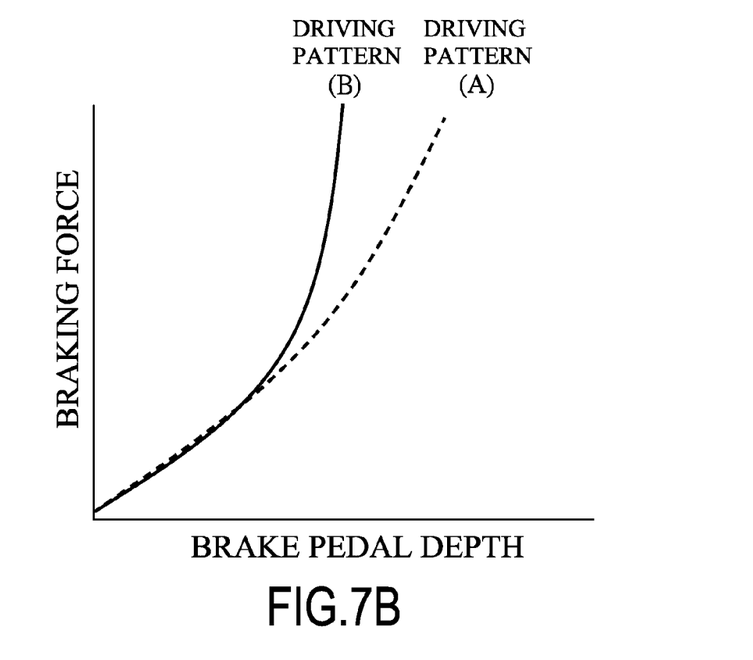

With reference to FIG. 7A, a braking parameter curve associated with brake pedal depth and braking force of a conventional vehicle in a normal driving state is shown. The braking parameter curve is in the form of a straight line, meaning that the braking force is proportional to the brake pedal depth. However, when the vehicle speed accelerates, the braking force is actually adjusted depending on the driving pattern. With reference to FIG. 7B, there are two braking parameter curves, the braking parameter curve adjacent to Y axis is steeper among the two braking parameter curves with a larger braking force under the same brake pedal path of the two braking parameter curves and corresponds to the driving pattern B, and the braking parameter curve away from Y axis is more flat among the two braking parameter curves with a smaller braking force under the same brake pedal path of the two braking parameter curves and corresponds to the driving pattern A. The braking parameter curve corresponding to the driving pattern B is suitable for very dangerous level with a relatively short braking distance (safe distance) to avoid collision arising from late braking The braking parameter curve corresponding to the driving pattern A is suitable for the very safe level or the safe level with a relatively long braking distance (safe distance) or smaller braking force.

Figure 8:
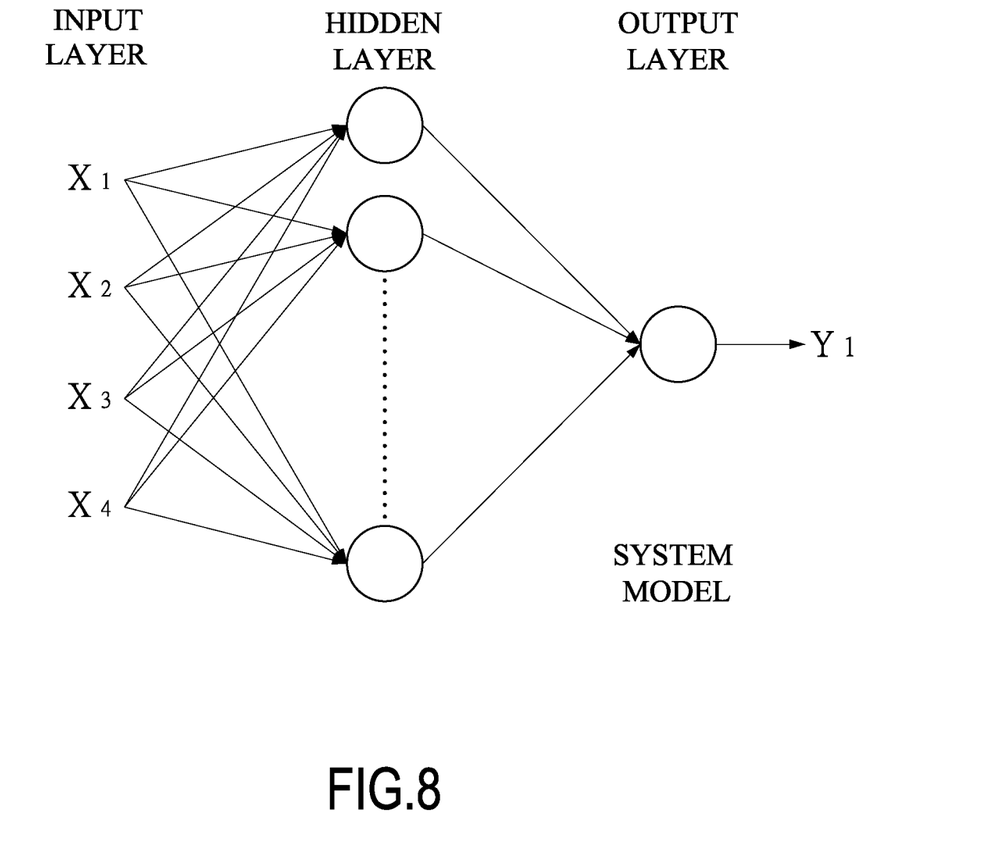
FIG. 8 is a schematic diagram of a model of a neural network system in accordance with the present invention.

With reference to FIG. 8, after the four driving patterns are established, a neural network algorithm is used to determine to which driving pattern a vehicle driver pertains. As a neutral system utilizes massive simple connected artificial neurons to mimic the capability of a biological neural network so as to acquire information from external environment or other artificial neurons. A simple computation is performed on the acquired information to generate a result, which is outputted to the external environment or the other artificial neurons. A system model of the neural network has a hidden layer constructed between an input layer and an output layer so that inputted characteristic signals ($X_1$, $X_2$, $X_3$ and $X_4$) are classified by the hidden layer and then characteristic value ($Y_1$) is outputted from the output layer.

Figure 9:
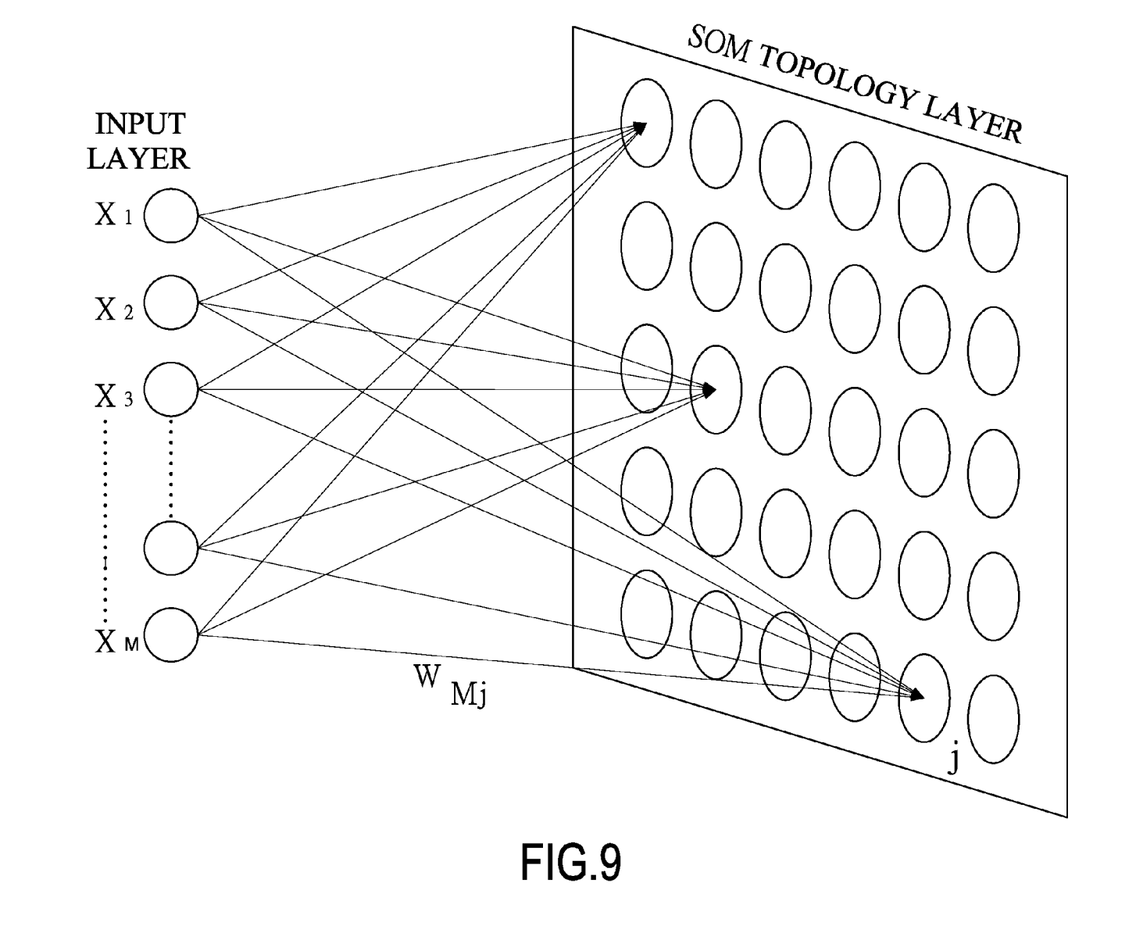
FIG. 9 is a topology diagram of a self-organizing map (SOM) network in accordance with the present invention.
Figure 10:
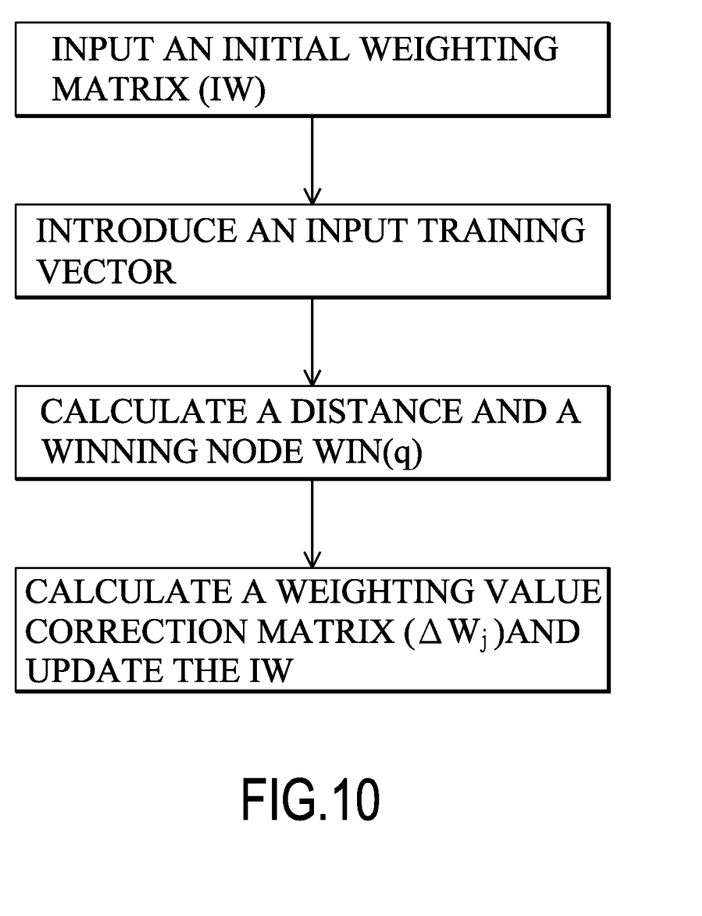
FIG. 10 is a flow diagram showing algorithm performed by the SOM network in FIG. 9.

With reference to FIGS. 9 and 10, a self-organizing map (SOM) algorithm in accordance with the present invention is shown. A basic concept of the SOM algorithm resides in a Euclidean distance of each processing unit of the output layer, which is mapped by the inputted characteristic value. The processing unit with the minimum distance is a prioritized unit with a weighting value adjusted to be as close to an original input vector. The neighboring area of the processing unit can also adjust the weighting value connected therewith for the Euclidean distance between the neighboring area and the input vector to be reduced.

A radius of a neighboring center is expressed by:

$$R^{n+1} = \lambda \times R^n$$

where
R is the radius of a neighboring center (q);
$\lambda$ is a radius adjustment factor.
A neighboring distance is expressed by:

$$dis_{jq} = \|r_j - r_q\| = \sqrt{(x_j - x_q)^2 + (y_j - y_q)^2}$$

where
$dis_{jq}$ is the distance between an output unit (j) and the neighboring center (q);

$r_j$ is the topology position ($x_j$, $y_j$) of the output unit (j);
$r_q$ is the topology position ($x_q$, $y_q$) of the neighboring center (q).

A neighboring function is expressed by:

$$K_{jq} = e^{-\left(\frac{dis_{jq}}{R}\right)^2}$$

where
K is a weighting relationship of the output unit (j) and the neighboring center (q);
R is the radius of the neighboring center (q).
A weighting value correction matrix is expressed by:

$$\Delta W_j = \eta \times [X - W_j] \times K_{jq}$$

where
$\eta$ is a learning rate;
X is an input vector;
$K_{jq}$ is a neighboring function;
$W_j$ is a weighting matrix of output unit (j);
$\Delta W_j$ is a weighting value correction matrix, $W_j$ (next time)=$\Delta W_j + W_j$ (present).

With further reference to FIG. 10, the SOM algorithm has steps of inputting an initial weighting matrix (IW), introducing an input training vector, calculating a distance and a winning node, which is the node having the shortest distance between the output unit (j) and the input training vector, $$\text{Win}(q) = \min_{j=1 \ldots N} dis_{Xj},$$

calculating a weighting matrix at next time and a weighting matrix at present, and updating the IW.

Figure 11:
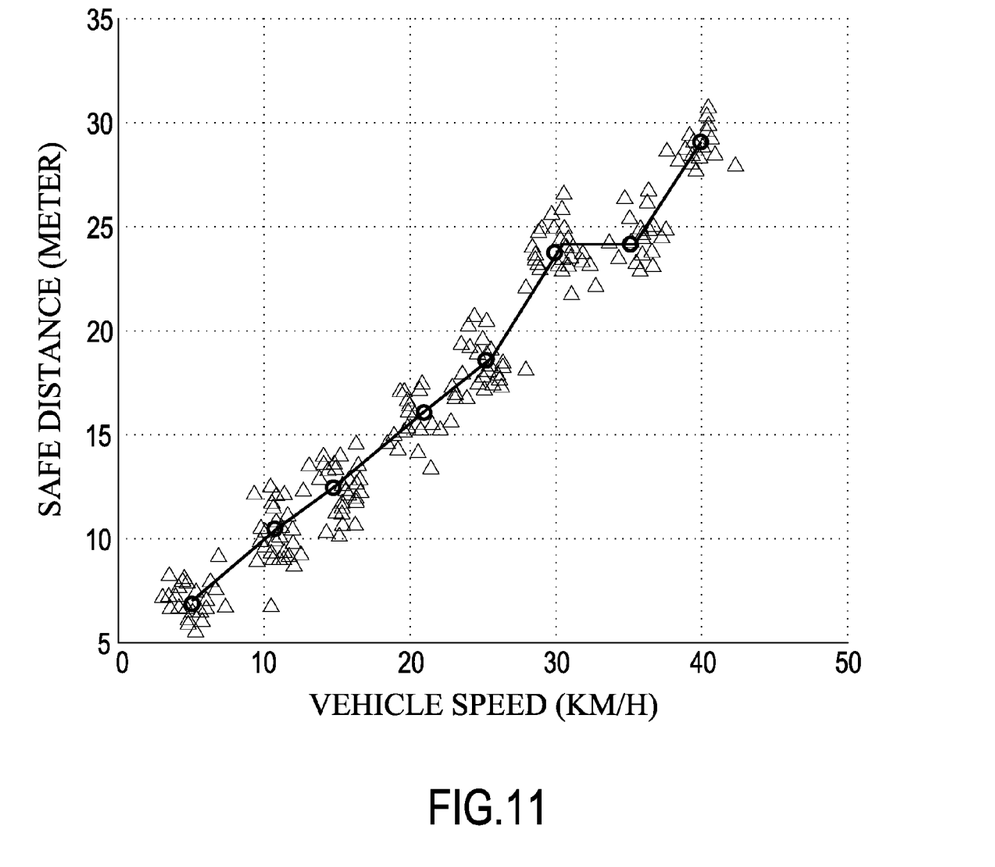
FIG. 11 is a curve diagram showing a curve mapped by distances between vehicles and vehicle speeds associated with driving behaviors in accordance with the present invention.

With reference to FIG. 11, a curve mapped by vehicle speed and distance between vehicles is obtained by collecting the safe distances kept during different vehicle speed ranges of various drivers and mapping to corresponding driving patterns with SOM algorithm to induce a curve associated with the vehicle speed and distance between vehicles of corresponding driving patterns.

The foregoing statistical analysis and the SOM algorithm can be used to classify a driving pattern of a driver of a vehicle. The control parameters for driving the vehicle can be adjusted according to the driving pattern so that the safe distance and the timing of braking action meet the driver's driving habits.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An adaptive anti-collision method for vehicles, wherein each vehicle having multiple sensors and a control unit, the sensors acquire a vehicle speed and a measured distance between the vehicle and an obstacle in the front, the control unit is electrically connected to an electronic control unit (ECU) of the vehicle and the sensors, and the adaptive anti-collision method is performed by the control unit and comprises steps of:

creating multiple driving patterns and indices or alert levels corresponding to the driving patterns, wherein each driving pattern has a vehicle speed, a safe distance and a reference braking distance related parameter, and the driving pattern at the vehicle speed corresponds to a comparison relationship between the measured distance and the safe distance and one of four safe levels;

analyzing the vehicle speed and the measured distance acquired by the sensors to determine one of the driving patterns, wherein actual driving conditions of the vehicle are statistically analyzed to acquire a driving state of a driver of the vehicle and classify into a corresponding driving pattern associated with the driver so as to generate one of the indices or the alert levels corresponding to the driving pattern and vary control parameters of the vehicle according to the classified driving patterns, wherein the index generated according to the driving patterns is calculated by $$\text{Index} = \frac{\left(\frac{a1 \times A + a2 \times B + a3 \times C + a4 \times D}{a1 + a2 + a3 + a4}\right)}{(A + B + C + D)}$$

where a1, a2, a3 and a4 are weight factors, and A, B, C, D are frequencies of the driving patterns of the driver corresponding to the four safe levels; and providing driver assistance and control, wherein if the driver has not responded to the alert, the control unit instructs the ECU to issue the alert according to a corresponding control parameter and to provide a braking assistance or brake the vehicle.

2. The method as claimed in claim 1, wherein the driving pattern of the driver is analyzed with a neural network.

3. The method as claimed in claim 2, wherein the neural network is calculated by a self-organizing map (SOM) algorithm, and the SOM algorithm includes steps of:

inputting an initial weighting matrix (IW);
introducing an input training vector;
calculating a distance and a winning node, wherein the winning node has the shortest distance between an output unit (j) and the input training vector;
calculating a weighting value correction matrix ($\Delta W \downarrow j$), wherein the weighting value correction matrix is a difference between a weighting matrix at next time and a weighting matrix at present; and
updating the IW;
wherein
a radius of a neighboring center (q) is expressed by:

$$R^{n+1} = \lambda \times R^n$$

where
R is a radius of a neighboring center (q); and
$\lambda$ is a radius adjustment factor;
a neighboring distance is expressed by:

$$dis_{jq} = \|r_j - r_q\| = \sqrt{(x_j - x_q)^2 + (y_j - y_q)^2}$$

where
$dis_{jq}$ is a distance between the output unit (j) and the neighboring center (q);
$r_j$ is a topology position ($x_j$, $y_j$) of the output unit (j); and
$r_q$ is the topology position ($x_q$, $y_q$) of the neighboring center (q);

a neighboring function is expressed by:

$$K_{jq} = e^{-\left(\frac{dis_{jq}}{R}\right)^2}$$

where
$K_{jq}$ is a weighting relationship of the output unit (j) and the neighboring center (q); and
R is the radius of the neighboring center (q);
a weighting value correction matrix is expressed by:

$$\Delta W_j = \eta \times \lfloor X - W_j \rfloor \times K_{jq}$$

where
$\eta$ is a learning rate;
X is an input vector;
$K_{jq}$ is a neighboring function;
$W_j$ is a weighting matrix of the output unit (j); and
$\Delta W_j$ is the weighting value correction matrix, $W_j$ (next time)=$\Delta W_j + W_j$ (present).

4. The method as claimed in claim 3, wherein the driving pattern is classified into two types respectively corresponding to a safe level and a slightly dangerous level, the safe level is classified when the measured distance is greater than the safe distance, and the slightly dangerous level is classified when the measured distance is less than the safe distance.

5. The method as claimed in claim 4, wherein the driving pattern is further classified into two additional types respectively corresponding to a very safe level and a very dangerous level, the very safe level is classified when the measured distance is greater than double of the safe distance, the very dangerous level is classified when the measured distance is less than two thirds of the safe distance, and the slightly dangerous level is classified when the measured distance is within two thirds of the safe distance and the safe distance.

6. The method as claimed in claim 1, wherein after the measured distance and the vehicle speed detected by the sensors are analyzed to classify into a driving pattern, the measured distance between the obstacle and the vehicle is further updated, and if the measured distance is less than the index of the driving pattern of the driver, an alert is issued to warn the driver.

7. The method as claimed in claim 6, wherein after the alert is issued to warn the driver, if the measured distance is still less than the index and the driver has not responded to avoid the obstacle, the control unit automatically activates a braking system of the vehicle to stop the vehicle.

8. The method as claimed in claim 1, wherein the driving pattern is classified into two types respectively corresponding to a safe level and a slightly dangerous level, the safe level is classified when the measured distance is greater than the safe distance, and the slightly dangerous level is classified when the measured distance is less than the safe distance.

9. The method as claimed in claim 8, wherein the driving pattern is further classified into two additional types respectively corresponding to a very safe level and a very dangerous level, the very safe level is classified when the measured distance is greater than double of the safe distance, the very dangerous level is classified when the measured distance is less than two thirds of the safe distance, and the slightly dangerous level is classified when the measured distance is within two thirds of the safe distance and the safe distance.

* * * * *